(12) United States Patent
Lee et al.

(10) Patent No.: US 7,937,046 B2
(45) Date of Patent: May 3, 2011

(54) WIRELESS COMMUNICATION DEVICE FOR RECEIVING MOBILE BROADCASTING SIGNAL AND TRANSMITTING/RECEIVING BLUETOOTH SIGNAL WITH SINGLE ANTENNA

(75) Inventors: Seong Wook Lee, Suwon-si (KR); Kee Dug Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1124 days.

(21) Appl. No.: 11/702,016

(22) Filed: Feb. 2, 2007

(65) Prior Publication Data

US 2008/0025276 A1  Jan. 31, 2008

(30) Foreign Application Priority Data

Jul. 27, 2006 (KR) .................. 10-2006-0070923

(51) Int. Cl.
*H04B 1/40* (2006.01)

(52) U.S. Cl. ... 455/88; 455/41.2; 455/552.1; 455/553.1; 370/276; 333/133

(58) Field of Classification Search ............ 455/88, 455/41.2, 552.1, 553.1, 168.1, 73, 572; 370/276, 370/397; 333/133
See application file for complete search history.

(56) References Cited

U.S. PATENT DOCUMENTS

| | | | | |
|---|---|---|---|---|
| 6,694,150 | B1* | 2/2004 | Standke et al. | 455/552.1 |
| 6,909,401 | B2* | 6/2005 | Rutfors et al. | 343/702 |
| 7,212,789 | B2* | 5/2007 | Kuffner | 455/83 |
| 7,230,510 | B2* | 6/2007 | Lobeek | 333/133 |
| 7,263,072 | B2* | 8/2007 | Martinez | 370/276 |
| 7,349,701 | B2* | 3/2008 | Lastinger et al. | 455/446 |
| 7,496,332 | B2* | 2/2009 | Ishiwata et al. | 455/88 |
| 7,499,420 | B2* | 3/2009 | Huh et al. | 370/320 |
| 2003/0189519 | A1* | 10/2003 | Rutfors et al. | 343/702 |
| 2004/0051669 | A1* | 3/2004 | Rutfors et al. | 343/702 |
| 2004/0127178 | A1* | 7/2004 | Kuffner | 455/133 |
| 2004/0208137 | A1* | 10/2004 | Martinez | 370/282 |
| 2005/0208982 | A1* | 9/2005 | Tung | 455/572 |
| 2007/0085108 | A1* | 4/2007 | White et al. | 257/173 |
| 2007/0161357 | A1* | 7/2007 | Tudosoiu et al. | 455/129 |
| 2007/0161358 | A1* | 7/2007 | Bogdan | 455/168.1 |
| 2007/0232222 | A1* | 10/2007 | de Jong | 455/3.06 |
| 2007/0300265 | A1* | 12/2007 | Karkkainen | 725/62 |
| 2008/0166980 | A1* | 7/2008 | Fukamachi et al. | 455/83 |
| 2008/0298453 | A1* | 12/2008 | Lerner et al. | 375/233 |
| 2009/0017772 | A1* | 1/2009 | Kemmochi et al. | 455/73 |
| 2009/0067103 | A1* | 3/2009 | Kijima et al. | 361/54 |
| 2009/0207764 | A1* | 8/2009 | Fukamachi et al. | 370/297 |
| 2009/0252350 | A1* | 10/2009 | Seguin | 381/109 |
| 2009/0253457 | A1* | 10/2009 | Seguin | 455/550.1 |

(Continued)

FOREIGN PATENT DOCUMENTS

CN  1647394  7/2005

(Continued)

*Primary Examiner* — Minh D Dao
(74) *Attorney, Agent, or Firm* — The Farrell Law Firm, P.C.

(57) ABSTRACT

Provided is a wireless communication device for receiving a mobile broadcasting signal and transmitting/receiving a Bluetooth® signal through a single antenna, which allows separation of the two signals using a difference in their frequency bands. A diplexer separates the signals using different band-pass filters. The signals are respectively input into a mobile broadcasting module and a Bluetooth® module. The wireless communication device allows reception of mobile broadcasting and Bluetooth signals within different frequency bands through a single antenna, thus achieving a compact and thin device with a reduced antenna mounting space.

6 Claims, 3 Drawing Sheets

U.S. PATENT DOCUMENTS

2009/0254339 A1* 10/2009 Seguin .......................... 704/212
2009/0285135 A1* 11/2009 Rousu et al. .................. 370/297
2009/0305746 A1* 12/2009 Pursche et al. ............. 455/569.2

FOREIGN PATENT DOCUMENTS

| | | |
|---|---|---|
| DE | 10352642 | 11/2003 |
| EP | 1659699 | 5/2006 |
| JP | 2002-237764 | 8/2002 |
| JP | 2003-087023 | 3/2003 |
| JP | 2001-163521 | 6/2003 |
| JP | 2005-117482 | 4/2005 |
| KR | 1020030023438 | 3/2003 |
| KR | 1020030064717 | 8/2003 |
| KR | 1020040108479 | 12/2004 |
| KR | 1020050036107 | 4/2005 |
| KR | 1020050056032 | 6/2005 |
| KR | 1020060000128 | 1/2006 |
| KR | 1020060014657 | 2/2006 |
| KR | 10-0793303 | 1/2008 |
| WO | WO 03/088510 | 10/2003 |

* cited by examiner

WIRELESS COMMUNICATION DEVICE FOR RECEIVING MOBILE BROADCASTING SIGNAL AND TRANSMITTING/RECEIVING BLUETOOTH SIGNAL WITH SINGLE ANTENNA

PRIORITY

This application claims priority to an application entitled "WIRELESS COMMUNICATION DEVICE FOR RECEIVING MOBILE BROADCASTING SIGNAL AND TRANSMITTING/RECEIVING BLUETOOTH® SIGNAL WITH SINGLE ANTENNA" filed in the Korean Intellectual Property Office on Jul. 27, 2006 and assigned Serial No. 2006-70923, the contents of which are incorporated herein by reference.

BACKGROUND OF THE INVENTION

1. Field of the Invention

The present invention relates to a mobile broadcasting technology, and more particularly, to a wireless communication device for receiving a mobile broadcasting signal and transmitting/receiving a Bluetooth® signal with a single antenna.

2. Description of the Related Art

Recently, there has been substantial competition to develop services and technologies related to mobile multimedia broadcasting. Mobile multimedia broadcasting is a new service that combines with a mobile communication technology, utilizing the advantages of both broadcasting and mobile communication.

The European mobile broadcasting technology named DVB-H (Digital Video Broadcasting Handheld) and the US mobile broadcasting technology named MediaFLO aim to commercialize in the immediate future. A satellite digital multimedia broadcasting (S-DMB) technology in Korea has commenced commercialization. The world's first terrestrial DMB (T-DMB) broadcasting service has also been launched in Korea based on the Eureka-147 standard.

DMB refers to a broadcasting service that provides a user with a digitally modulated multimedia (audio-video) signal. The DMB enables the user to view diverse multimedia broadcasts through a receiver having a non-directional receiving antenna even while the user is in motion. Development of a receiver for receiving DMB' services is essential for commercialization of DMB services. Active development of a wide variety of DMB receivers and terminals contributes to commercialization of DMB services.

DMB broadcast signals can be received through a dedicated DMB receiver as well as a portable or in-vehicle terminal supporting the function to receive DMB services. The DMB receiving function is currently embedded within various types of terminals such as mobile phones, notebook personal computers, personal digital assistants (PDAs), portable multimedia players (PMPs), pedestrian navigation systems and car navigation systems.

Following the expanding use of DMB receivers, wireless headsets are increasingly being used as accessory devices. Wireless headsets enable a wearer to conveniently listen to audio files using Bluetooth® designed for short-range communication. The Bluetooth® short-range standard offers bi-directional wireless communication between two or more devices within a range of up to 10 m by wirelessly connecting the devices.

However, Bluetooth® operates at 2.4 GHz frequency band while DMB uses different frequency bands. For example, S-DMB operates at a frequency band of 2.63 to 2.6555 GHz. T-DMB operates at frequency bands of 174 to 240 MHz and 1.452 to 1.492 GHz. A conventional DMB receiver simultaneously using the Bluetooth® signal and DMB signal at different frequency bands requires two discrete antennas.

However, since use of two discrete antennas results in increased mounting space, it is difficult to embed them in a small, flat terminal. Due to increasing demands for smaller and thinner terminals, development of a terminal requiring reduced antenna mounting space is needed.

SUMMARY OF THE INVENTION

In order to solve the above problems, an object of the present invention is to provide a wireless communication device for receiving a mobile broadcasting signal and transmitting and receiving a Bluetooth® signal with a single antenna requiring reduced antenna mounting space.

Another object of the present invention is to provide a compact, thin wireless communication device for receiving a mobile broadcasting signal and transmitting/receiving a Bluetooth® signal.

In order to achieve the above objects, according to the present invention, there is provided a wireless communication device for receiving a mobile broadcasting signal and transmitting/receiving a Bluetooth® signal with a single antenna, which allows separation of the two signals using a difference in their frequency bands.

The wireless communication device includes a single antenna, a diplexer, a mobile broadcasting module and a Bluetooth® module. The single antenna receives a mobile broadcasting signal and transmits and receives a Bluetooth® signal. The diplexer connected to the antenna includes a first band-pass filter passing the mobile broadcasting signal and a second band-pass filter passing the Bluetooth® signal. The mobile broadcasting module is connected to the first band-pass filter and decodes the mobile broadcasting signal. The Bluetooth® module is connected to the second band-pass filter and converts the Bluetooth® signal into data.

In the wireless communication device, the mobile broadcasting signal may be a terrestrial Digital Multimedia Broadcasting (T-DMB) signal and the mobile broadcasting module may be a T-DMB module. The first band-pass filter may be a low-pass filter (LPF) and the second band-pass filter may be a high-pass filter (HPF).

The T-DMB signal may have two different types of signals having first and second frequency bands, respectively. The wireless communication device may further include a third and a fourth band-pass filter connected between the LPF and the T-DMB module. The third band-pass filter passes the T-DMB signal from the first frequency band. The fourth band-pass filter passes the T-DMB signal from the second frequency band.

The T-DMB signal may have a band-3 signal and an L-band signal. The wireless communication device may further include a band-3 filter and an L-band filter connected between the LPF and the T-DMB module. The band-3 filter and the L-band filter respectively pass the band-3 signal and the L-band signal of the T-DMB signal.

In the wireless communication device, the mobile broadcasting signal may be a satellite DMB (S-DMB) signal and the mobile broadcasting module may be an S-DMB module. The first band-pass filter is an HPF and the second band-pass filter is an LPF.

The wireless communication device may further include a headset for receiving the Bluetooth® signal through the antenna.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Figure 1:
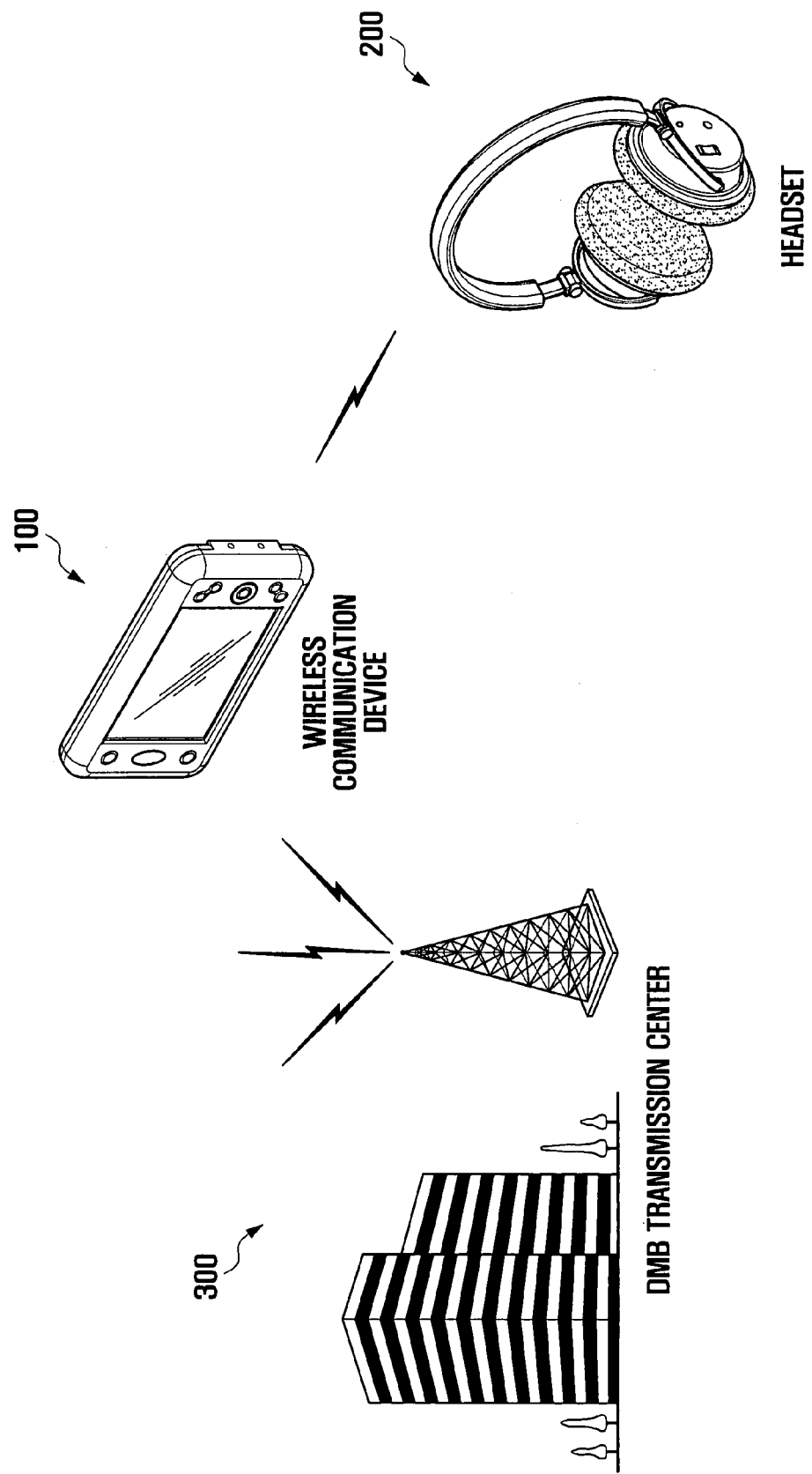
FIG. 1 is a diagram of a mobile broadcasting system to which the present invention is applied.

Hereinafter, preferred embodiments of the present invention are described in detail with reference to the accompanying drawings. The same reference symbols identify the same or corresponding elements in the drawings. Some constructions or processes known in the art may not be described for the sake of clarity and conciseness.

FIG. 1 is a diagram a mobile broadcasting system to which the present invention is applied. Referring to FIG. 1, a DMB transmission center 300 transmits a DMB signal received from a broadcasting station (not shown). A wireless communication device 100, e.g. a DMB receiver, receives a DMB signal from the DMB transmission center 300 and outputs video and audio data through signal processing. The wireless communication device 100 is not limited to a DMB receiver, and may be another portable or in-vehicle terminal having a DMB reception function. A headset 200 communicates with the wireless communication device 100 using Bluetooth® to receive the audio data of DMB data output from the wireless communication device 100. Although FIG. 1 shows the headset 200 and the wireless communication device 100 as separate elements for convenience, the headset 200 may be integrated into the wireless communication device 100.

The system shown in FIG. 1 is a T-DMB system. If the mobile broadcasting system of FIG. 1 is an S-DMB system, it further requires a gap filler and a broadcasting satellite receiving a DMB signal from the DMB transmission center 300 and transmitting the DMB signal to a ground station.

In the mobile broadcasting system having the above-mentioned construction, a conventional wireless communication device requires two separate antennas, i.e. an antenna for receiving a DMB signal and an antenna for transmitting/receiving a Bluetooth® signal. However, the wireless communication device 100 according to the present invention receives a DMB signal and transmits or receives a Bluetooth® signal through a single antenna, which is possible by changing the front end configuration.

Figure 2:
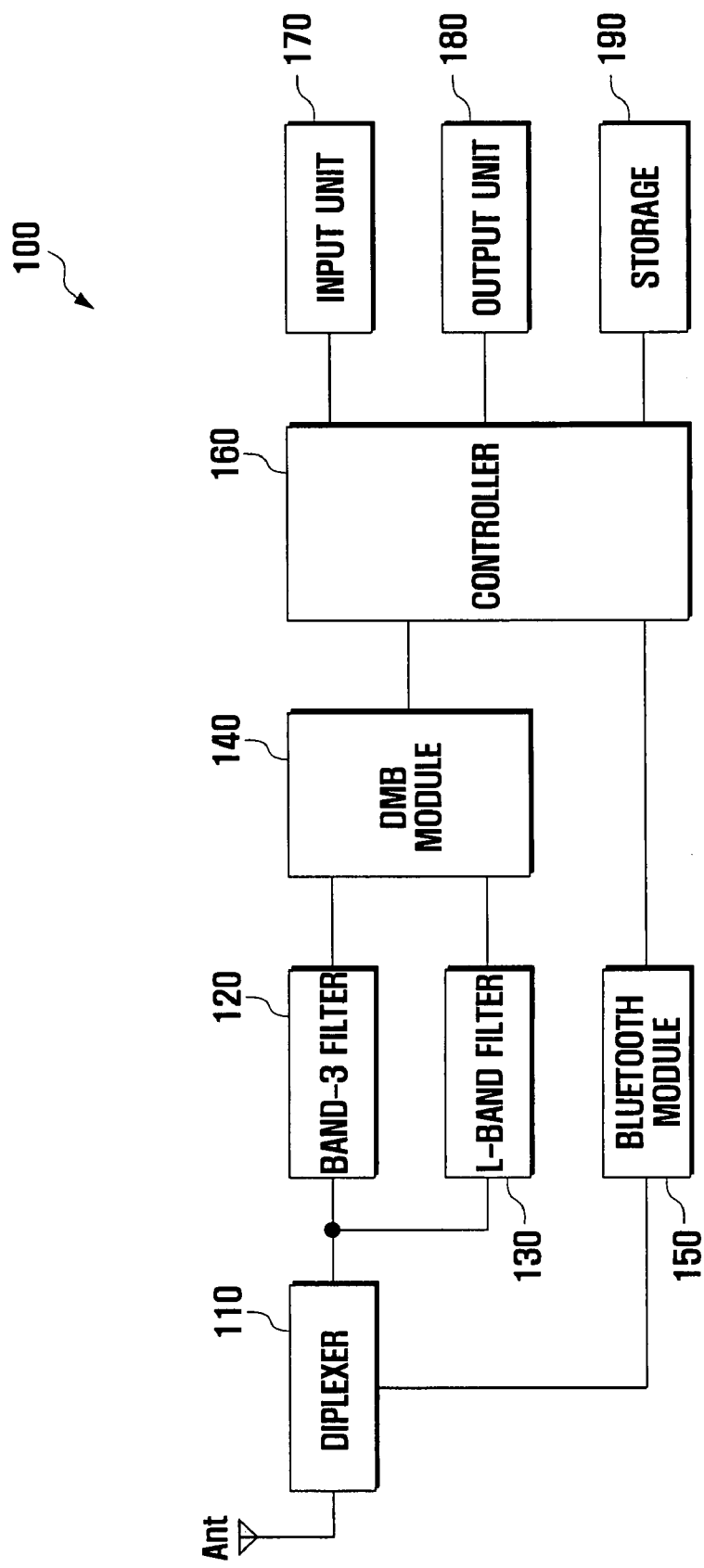
FIG. 2 is a block diagram of a wireless communication device according to the present invention.

FIG. 2 is a block diagram of the wireless communication device 100 according to the present invention.

Referring to FIG. 2, the wireless communication device 100 is a receiver that receives a mobile broadcasting signal through a single antenna Ant. The wireless communication device 100 is a dedicated DMB receiver receiving a T-DMB signal or portable or in-vehicle terminal. Alternatively, the wireless communication device 100 may be a receiver or terminal receiving a satellite DMB signal or other types of mobile broadcasting signals. The wireless communication device 100 includes a diplexer 110, a band-3 filter 120, an L-band filter 130, a DMB module 140, a Bluetooth® module 150, a controller 160, an input unit 170, an output unit 180 and a storage 190.

The single antenna Ant is used to receive a mobile broadcasting signal (hereinafter T-DMB signal) and transmit and receive a Bluetooth® signal. That is, the single antenna Ant may be used for receiving both a T-DMB signal and a Bluetooth® signal using different frequency bands. The use of a single antenna was addressed in the Korean Patent Application No. 2006-0071218.

The diplexer 110 is connected to the antenna Ant. The diplexer 110 uses a difference in frequency bands to separate a T-DMB signal and a Bluetooth® signal. To achieve the function, the diplexer 110 includes a first band-pass filter allowing a mobile broadcasting signal to pass through and a second band-pass filter allowing a Bluetooth® signal to pass through.

In an alternative embodiment of the wireless communication device 100, the diplexer 110 may be replaced by a diplexer 410. The diplexer 410 uses a difference in frequency bands to separate an S-DMB signal and a Bluetooth® signal. To achieve the function, the diplexer 410 includes a first band-pass filter allowing a mobile broadcasting signal to pass through and a second band-pass filter allowing a Bluetooth® signal to pass through.

Figure 3:
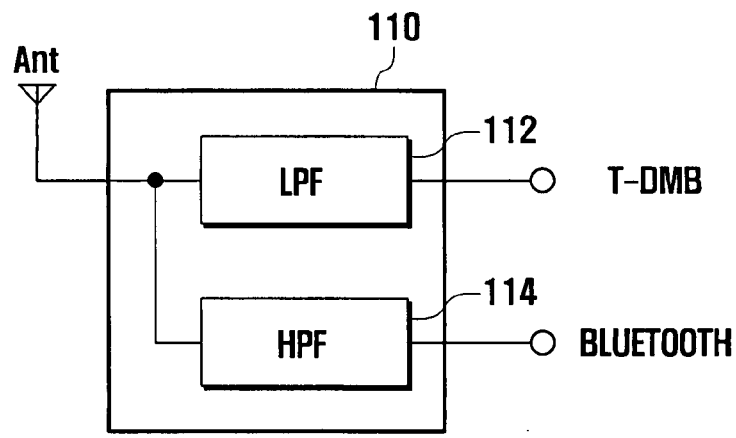
FIG. 3 is a detailed diagram of the diplexer shown in FIG. 2, according to a first embodiment of the present invention.
Figure 4:
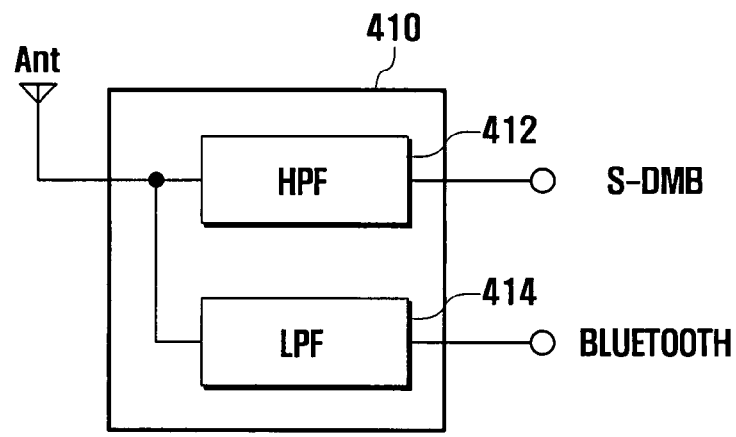
FIG. 4 is a detailed diagram of a diplexer of a wireless communication device according to a second embodiment of the present invention.

FIGS. 3 and 4 are diagrams illustrating the detailed configurations of the diplexer 110 according to a first embodiment of the present invention, and the diplexer 410 according to a second embodiment of the present invention.

Referring to FIG. 3, the diplexer 110 includes a low-pass filter (LPF) 112 and a high-pass filter (HPF) 114. When a T-DMB signal and a Bluetooth® signal are received simultaneously, the LPF 112 passes the T-DMB signal at a lower frequency band while the HPF 114 passes the Bluetooth® signal at a higher frequency band.

Referring to FIG. 4, when an S-DMB signal and a Bluetooth® signal are received simultaneously, the HPF 412 of the diplexer 410 passes the S-DMB signal while the LPF 414 passes the Bluetooth® signal because the S-DMB signal operates at a higher frequency band than the T-DMB signal.

In this manner, the diplexer 110 or 410 in the wireless communication device 100 according to the present invention can separate a DMB signal and a Bluetooth® signal using a difference in frequency bands. Because the two signals can be received through the single antenna Ant, an antenna mounting space can be reduced, thus providing a compact, thin wireless communication device.

Returning to FIG. 2, the T-DMB signal separated by the diplexer 110 is input to the DMB module 140. The T-DMB signal may have two types of signals with different frequency bands (hereinafter first and second frequency bands). In this case, the wireless communication device 100 further includes third and fourth band-pass filters connected between the LPF 112 of the diplexer 110 and the DMB module 140. The third band-pass filter passes only the T-DMB signal from the first frequency band and the fourth band-pass filter passes only the T-DMB signal from the second frequency band.

For example, the first frequency band may be 174 to 240 MHz for a band-3 signal and the second frequency band may be 1.452 to 1.492 GHz for an L-band signal. The third and fourth band-pass filters are respectively a band-3 filter 120 passing the band-3 signal and an L-band filter 130 passing the L-band signal.

The DMB module 140 decodes the T-DMB signals that have passed through the band-3 filter 120 and the L-band filter 130. To achieve the function, the DMB module 140 includes an RF tuner (not shown) and a baseband Integrated Circuit (IC) (not shown) and decodes the T-DMB signals before transmission to the controller 160.

The Bluetooth® signal separated by the diplexer 110 is input to the Bluetooth® module 150, which is a baseband chip that is controlled by the controller 160 to convert the Bluetooth® signal into data.

The controller 160 controls the operation of the wireless communication device 100. For example, the controller 160 may control the DMB module 140 and the Bluetooth® module 150 according to user commands input through the input unit 170 or a stored control algorithm.

The input unit 170 receives a signal generated by a user's manipulation for controlling the wireless communication device 100 and delivers the signal to the controller 160. For example, the input unit 170 may be a key pad, input button, touch pad, touch screen or microphone.

The output unit 180 outputs received DMB audio and video data and various information related to the operation of the wireless communication device 100. The output unit 180 may be a video display such as a liquid crystal display (LCD) and an audio output device such as a speaker.

The storage 190 stores programs and data related to the operation of the wireless communication device 100 as well as the received DMB data.

A wireless communication device for receiving a mobile broadcasting signal such as a T-DMB signal and transmitting/receiving a Bluetooth® short-range wireless communication signal according to the present invention allows separation of the mobile broadcasting signal and the Bluetooth® signal through a diplexer. Thus, because the two signals having different frequencies can be received through a single antenna, a compact, thin wireless communication device with a reduced antenna mounting space can be provided.

Although specific terms are employed herein, they are used in a generic and descriptive sense only and not for purposes of limitation. While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A wireless communication device comprising:
   a single antenna for receiving a T-DMB (Terrestrial Digital Multimedia Broadcasting) signal and transmitting and receiving a Bluetooth® signal;
   a diplexer connected to the antenna and including an LPF (Low-Pass Filter) for passing the T-DMB signal and an HPF (High-Pass Filter) for passing the Bluetooth® signal;
   a T-DMB module connected to the LPF for decoding the T-DMB signal; and
   a Bluetooth® module connected to the HPF for converting the Bluetooth® signal into data,
   wherein the T-DMB signal has two different types of signals having first and second frequency bands, respectively.

2. The device of claim 1, further comprising:
   a third band-pass filter connected between the LPF and the T-DMB module for passing the T-DMB signal from the first frequency band; and
   a fourth band-pass filter connected between the LPF and the T-DMB module for passing the T-DMB signal from the second frequency band.

3. The device of claim 1, wherein the T-DMB signal includes a band-3 signal and an L-band signal.

4. The device of claim 3, further comprising:
   a band-3 filter connected between the LPF and the T-DMB module for passing the band-3 signal of the T-DMB signal; and
   an L-band filter connected between the LPF and the T-DMB module for passing the L-band signal of the T-DMB signal.

5. The device of claim 1, wherein the signal antenna receives an S-DMB (Satellite DMB) signal and an S-DMB module is connected to the LPF for decoding an S-DMB signal.

6. The device of claim 1, further comprising:
   a headset for receiving the Bluetooth® signal through the antenna.

* * * * *